United States Patent
Okamoto et al.

(10) Patent No.: US 7,315,108 B2
(45) Date of Patent: Jan. 1, 2008

(54) DRIVING DEVICE

(75) Inventors: Yasuhiro Okamoto, Tondabayashi (JP); Tomoyuki Yuasa, Sakai (JP)

(73) Assignee: Konica Minolta OPTO, Inc., Tokyo (JP)

( * ) Notice: Subject to any disclaimer, the term of this patent is extended or adjusted under 35 U.S.C. 154(b) by 0 days.

(21) Appl. No.: 11/391,824

(22) Filed: Mar. 29, 2006

(65) Prior Publication Data

US 2006/0220497 A1 Oct. 5, 2006

(30) Foreign Application Priority Data

Mar. 30, 2005 (JP) ............................. 2005-096915

(51) Int. Cl.
*H02N 2/00* (2006.01)
(52) U.S. Cl. ..................... 310/323.17; 310/323.02; 310/328
(58) Field of Classification Search ..................
310/323.02–323.19, 328
See application file for complete search history.

(56) References Cited

U.S. PATENT DOCUMENTS

| | | | | |
|---|---|---|---|---|
| 3,879,301 A | * | 4/1975 | Cairns | 508/104 |
| 5,013,956 A | * | 5/1991 | Kurozumi et al. | 310/323.11 |
| 5,136,201 A | * | 8/1992 | Culp | 310/328 |
| 5,554,905 A | * | 9/1996 | Gschwind et al. | 310/323.02 |
| 5,589,723 A | | 12/1996 | Yoshida et al. | |
| 5,994,819 A | | 11/1999 | Okamoto et al. | |
| 2002/0177499 A1 | * | 11/2002 | Ayukawa et al. | 474/135 |
| 2004/0267316 A1 | * | 12/2004 | Powell et al. | 606/231 |
| 2005/0250609 A1 | * | 11/2005 | Ayukawa et al. | 474/109 |

FOREIGN PATENT DOCUMENTS

| | | | |
|---|---|---|---|
| JP | 63-48168 | * | 2/1988 |
| JP | 06-261567 | * | 9/1994 |
| JP | 07-087763 | * | 3/1995 |
| JP | 2005-264349 | * | 9/2005 |

* cited by examiner

*Primary Examiner*—Thomas M. Dougherty
(74) *Attorney, Agent, or Firm*—Brinks Hofer Gilson & Lione

(57) ABSTRACT

A piezoelectric element expands and contracts when a pulse voltage is applied. A fixing body is fixed to one end of the piezoelectric element in an expansion-contraction direction. A driving shaft is fixed to the other end of the piezoelectric element in the expansion-contraction direction. A movable body is supported to the driving shaft slidably. When a pulse voltage is applied to the piezoelectric element, the piezoelectric element contracts and expands. Accordingly, the driving shaft oscillates, and the movable body slides along the driving shaft. A material of the driving shaft is fiber reinforced resin complex. A synthetic resin material composing the fiber reinforced resin complex is liquid crystal polymer or polyphenylene sulfide.

8 Claims, 5 Drawing Sheets

DRIVING DEVICE

The present application claims priority to Japanese Patent Application No. 2005-96915 filed on Mar. 30, 2005, the entire content of which is hereby incorporated by reference.

BACKGROUND OF THE INVENTION

1. Field of the Invention

The present invention relates to a driving device which is suitable for driving optical members such as lenses to be used in reading devices for recording media, such as camera, DVD, CD and MD, and endoscopes.

2. Description of the Related Art

Conventionally, driving devices, which move movable bodies using expansion and contraction of piezoelectric elements as electromechanical transducers, are known. FIGS. 1 and 2 illustrate an example of a linear-type driving device. A driving device 100 shown in FIG. 1 is constituted so that one end of a piezoelectric element 101 in an expansion-contraction direction is fixed to an end surface of a fixing body 102 by adhesive 102a, and the other end is fixed to a driving shaft 103 as a movable body supporting member by adhesive 101a. The piezoelectric element 101 is connected to a power feeding member 104 by conductive adhesive, and thus a predetermined pulse voltage is applied to the piezoelectric element 101.

As shown in FIG. 2, a movable body 108 is slidable along the driving shaft 103. The movable body 108 is composed of a slider 105, a holding member 106 that holds the driving shaft 103 with respect to the slider 105, and a plate spring 107 which pushes the holding member 106 which holds the driving shaft 103 towards the slider 105. When an optical member such as a lens is attached to the slider 105, the movable body 108 moves on the driving shaft 103 so that the optical member is driven to advance straight.

FIGS. 3(a1) to 3(b) illustrate a driving principle of the driving device 100. When a pulse voltage having a sawtooth waveform having a moderate rising portion (between A and B) and a convulsive trailing portion (between B and C) as shown in FIG. 3(b), for example, to the piezoelectric element 101 of the driving device 100, the piezoelectric element 101 moderately extends to its thickness-wise direction to displace in the moderate rising portion (between A and B) of the pulse voltage as shown in FIG. 3(a2), and the driving shaft 103 fixed to the piezoelectric element 101 moves to a let-out direction. Accordingly, the movable body 108 which is frictionally engaged with the driving shaft 103 moves together with the driving shaft 103.

Thereafter, the piezoelectric element 101 convulsively contracts to its thickness-wise direction to displace in the convulsive trailing portion (between B and C) of the pulse voltage, and also the driving shaft 103 fixed to the piezoelectric element 101 convulsively displaces to a return direction. At this time, as shown in FIG. 3(a3), when an inertial force of the movable body 108 overcomes a frictional force between the movable body 108 and the driving shaft 103 so as to slide, the movable body 108 substantially remains in that position and does not move. As a result, the movable body 108 moves from an initial state shown in FIG. 3(a1) to the let-out direction by a difference in moving amount between expansion and contraction. When such expansion and contraction of the piezoelectric element 101 are repeated, the movable body 108 is driven along the driving shaft 103 to the let-out direction.

On the contrary, the movable body 108 is driven to the return direction according to an opposite principle to the above principle. That is to say, when a pulse voltage of a sawtooth waveform composed of a convulsive rising portion and a moderate trailing portion is applied to the piezoelectric element 101, the piezoelectric element 101 quickly expands to displace in the convulsive rising portion of the pulse voltage, and accordingly also the driving shaft 103 fixed to the piezoelectric element 101 quickly displaces to the let-out direction. At this time, the inertial force of the movable body 108 overcomes the frictional force between the movable body 108 and the driving shaft 103 so as to slide, so that the movable body 108 substantially remains in that position and does not move.

Thereafter, the piezoelectric element 101 moderately contracts to displace in the moderate trailing portion of the pulse voltage, and accordingly also the driving shaft 103 fixed to the piezoelectric element 101 moderately displaces to the return direction. At this time, the movable body 108 as well as the driving shaft 103 displaces to the return direction. As a result, the movable body 108 moves from the initial state to the return direction by a difference in a moving amount between expansion and contraction. When such expansion and contraction of the piezoelectric element 101 are repeated, the movable body 108 is driven along the driving shaft 103 to the return direction.

As such a movable body supporting member (driving shaft) of the driving device 100 which generates a driving force via friction, U.S. Pat. No. 5,589,723 discloses a driving shaft which is manufactured by orienting carbon fiber in an axial direction and hardening it with epoxy resin. In this manufacturing method, however, most of the movable body supporting members have a constant shape in the axial direction, and thus a degree of shape freedom is small.

Further, U.S. Pat. No. 5,994,819 discloses that a hollow shaft made of ceramic is used as the movable body supporting member. Since the movable body supporting member made of ceramic, however, becomes heavier than a movable body supporting member made of a fiber reinforced resin complex, this member is not preferable in that a force from the piezoelectric element 101 is efficiently transmitted. Further, the cost of finishing surface roughness of the movable body supporting member into desired smoothness becomes high.

SUMMARY OF THE INVENTION

It is a main object of the present invention to provide a driving device which has a movable body supporting member which is light and inexpensive and has a large degree of shape freedom.

In order to achieve the above object, from a certain aspect of the present invention, in a driving device that has an electromechanical transducer which expands and contracts at the time of application of a voltage and a movable body supporting member which supports a movable body slidably and is bonded to the electromechanical transducer so as to displace together with the transducer, and moves the movable body along the supporting member using expansion and contraction of the electromechanical transducer, a material of the supporting member is a fiber reinforced resin complex, and a synthetic resin material composing the fiber reinforced resin complex is liquid crystal polymer or polyphenylene sulfide.

The invention itself, together with further objects and attendant advantages, will best be understood by reference to the following detailed description.

BRIEF DESCRIPTION OF THE DRAWINGS

In the following description, like parts are designated by like reference numbers throughout the several drawings.

DETAILED DESCRIPTION OF THE PREFERRED EMBODIMENT

An embodiment of the present invention is explained below with reference to the accompanying drawings.

Figure 1:
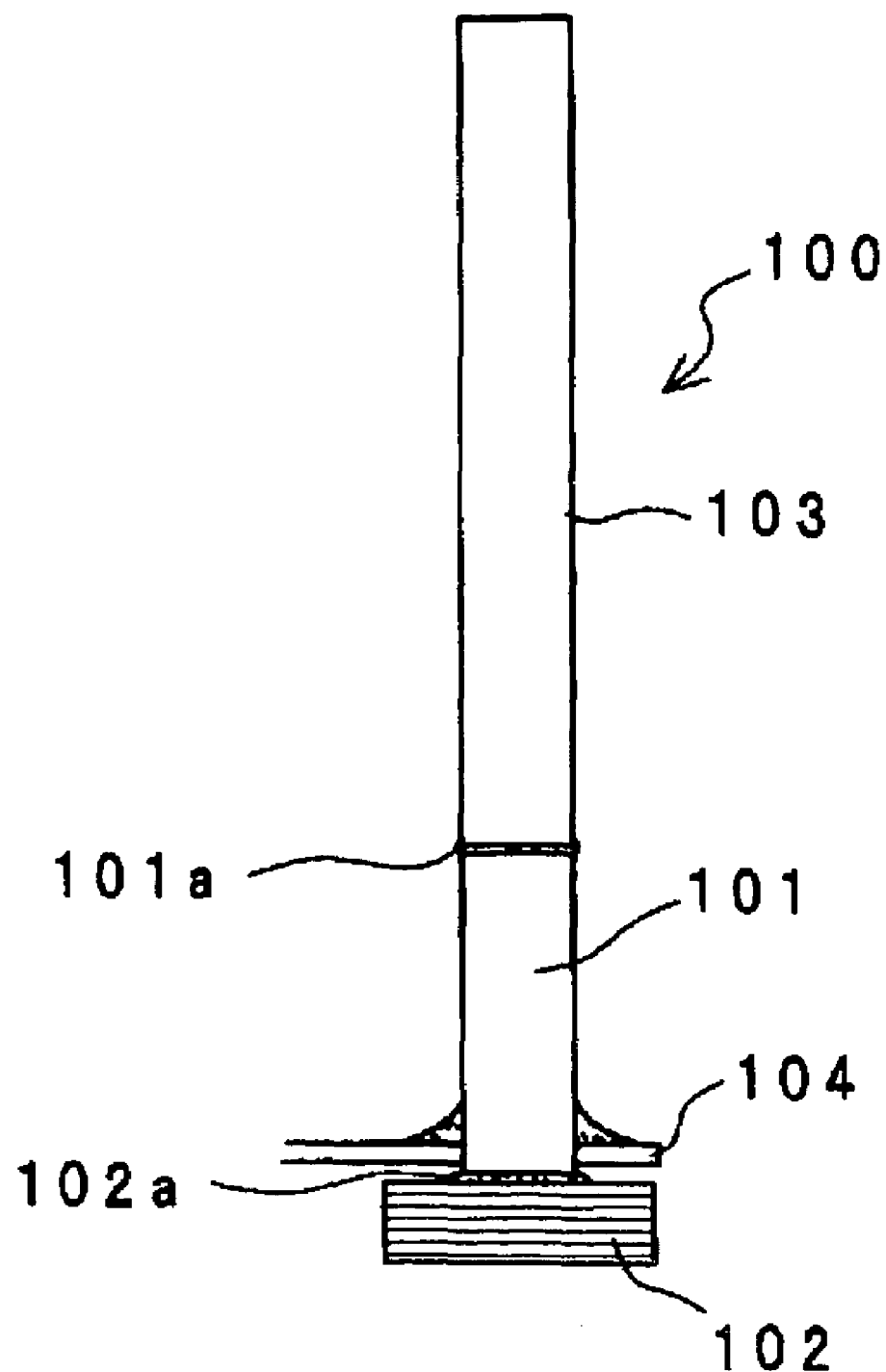
FIG. 1 is a side view of a driving device according to a conventional example.
Figure 2:
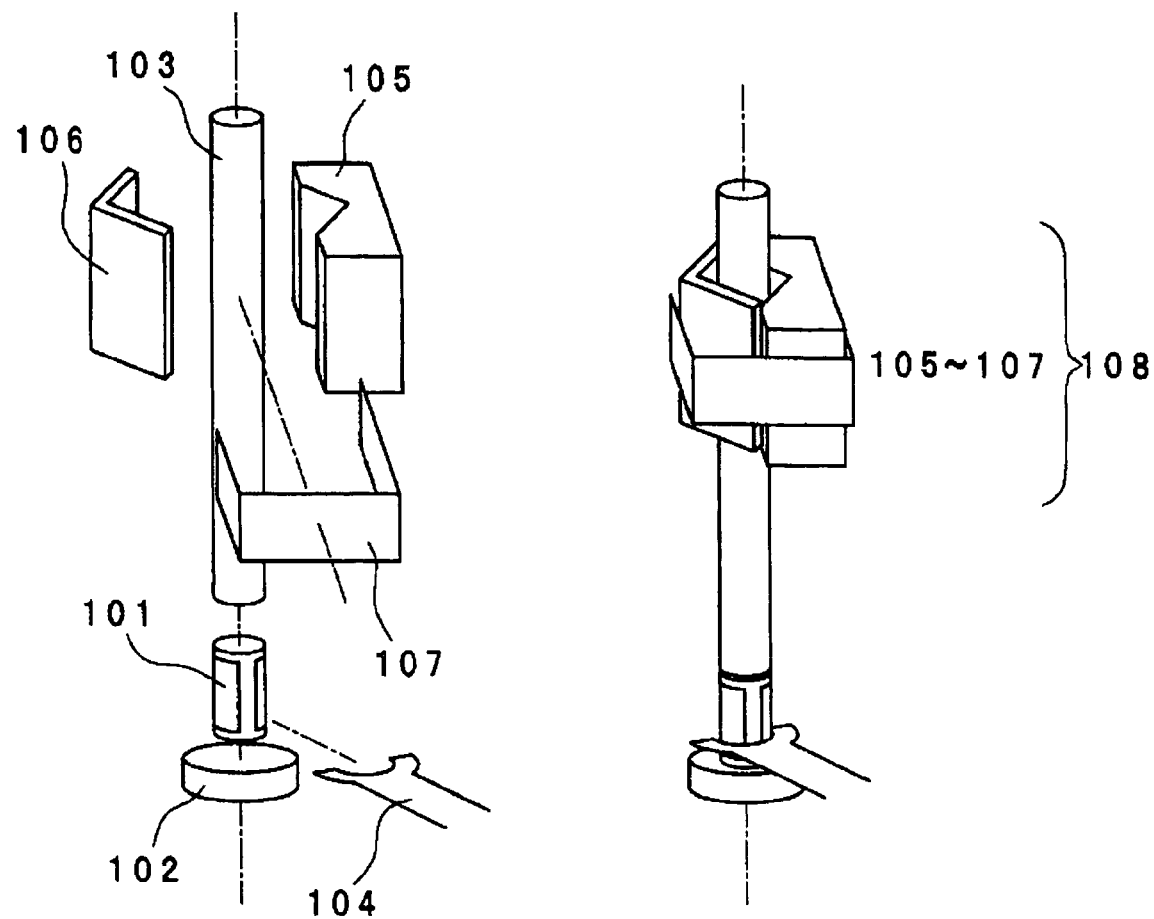
FIG. 2 is an exploded perspective view and an assembly diagram of the driving device including a movable body according to a conventional example.
Figure 3:
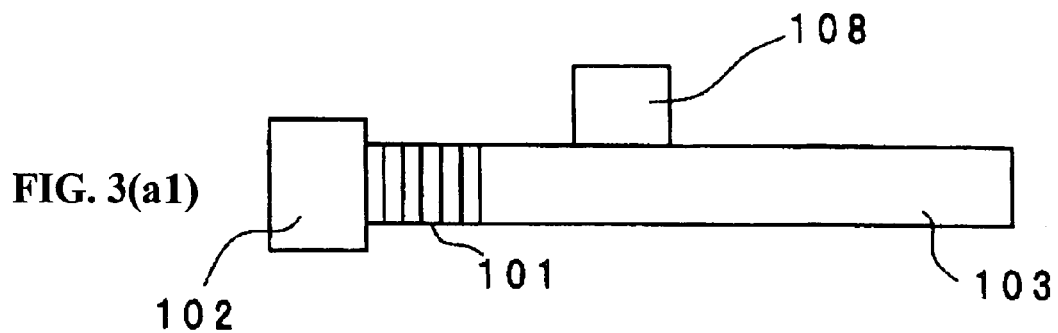
FIGS. 3($a$1) to ($b$) are diagrams for explaining an operating principle of the driving device.
Figure 3:
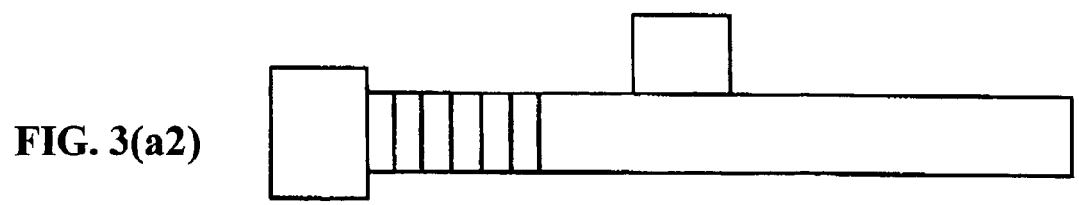
Figure 3:
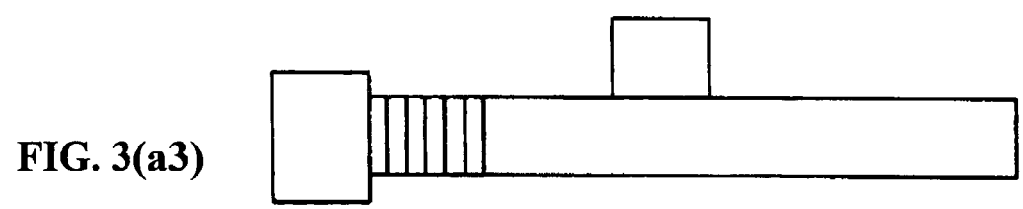
Figure 3B:
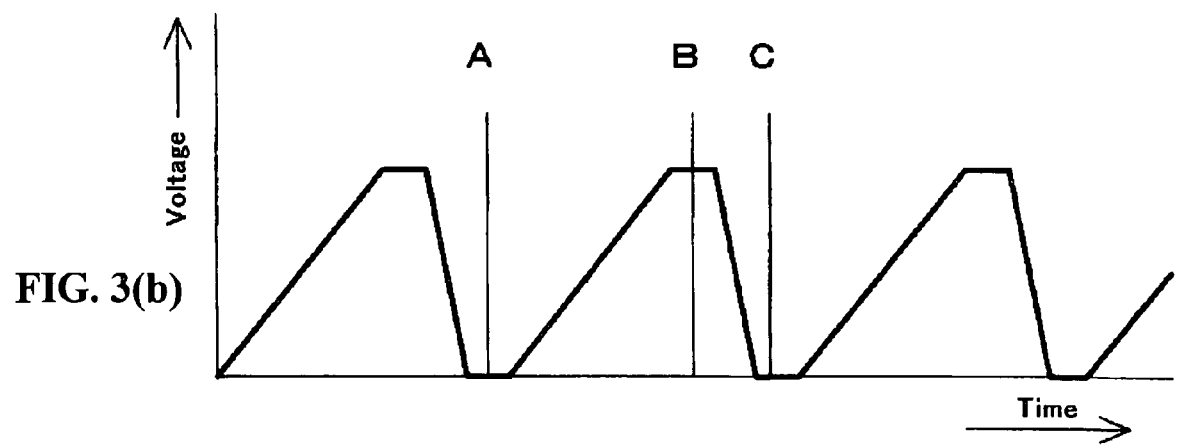
Figure 4:
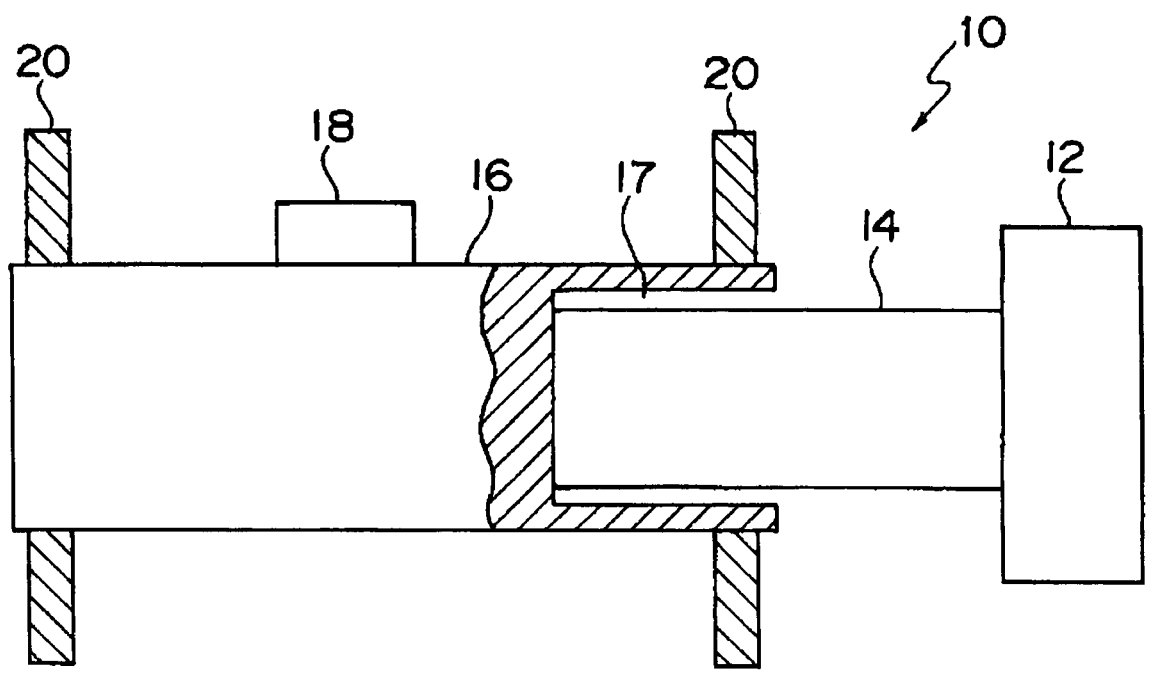
FIG. 4 is a side view including a partially sectional view illustrating the driving device according to an embodiment of the present invention.

FIG. 4 is a side view including a partially sectional view illustrating a schematic constitution of a driving device 10 according to one embodiment of the present invention. The driving device 10 has a fixing body 12, a piezoelectric element 14 as one example of an electromechanical transducer, a driving shaft (movable body supporting member) 16 and a movable body 18.

The fixing body 12 is fixed to a base member, not shown, of the driving device 10. The piezoelectric element 14 expands and contracts to an axial direction by applying a pulse voltage, and its one end of the expansion-contraction direction is bonded to be fixed to the fixing body 12. The driving shaft 16 has, for example, a column outer shape, and a hollow portion 17 is formed in the end portion. The other end of the piezoelectric element 14 in the expansion-contraction direction is bonded to be fixed to the driving shaft 16 with it being inserted into the hollow portion 17 of the driving shaft 16. When the piezoelectric element 14 is inserted into the driving shaft 16 and is fixed in such a manner, the entire thickness of the driving device 10 including the piezoelectric element 14 and the driving shaft 16 can be small.

The driving shaft 16 is supported to an axial direction in a displaceable manner with its both ends piercing two supporting plates 20 fixed with predetermined interval. The movable body 18 is frictionally engaged with the driving shaft 16 by a predetermined frictional force. When a ball casing, not shown, which supports an optical member such as a lens is connected to the movable body 18, the movable body 18 slides along the driving shaft 16 to an axial direction so that the optical member is driven to advance straight.

A material of the driving shaft 16 in the driving device 10 according to this embodiment is a fiber reinforced resin complex, and a synthetic resin material composing the fiber reinforced resin complex is a liquid crystal polymer (for example, liquid crystal polyester) or polyphenylene sulfide. When the material of the driving shaft 16 is the fiber reinforced resin complex and the synthetic resin material composing the fiber reinforced resin complex is liquid crystal polymer or polyphenylene sulfide, the driving shaft 16 can be manufactured by injection molding. As a result, a degree of shape freedom of the driving shaft 16 becomes high, and the manufacturing cost can be low. Further, since the driving shaft 16 is lighter than a driving shaft made of ceramic, a force from the piezoelectric element 14 can be efficiently transmitted, and its smooth surface which is suitable for sliding movement of the movable body 18 can be obtained without requiring fabrication.

Examples of the polyphenylene sulfide in the market are Lighten produced by Chevron Phillips Chemical Co., DIC·PPS produced by Dainippon Ink And Chemicals, Incorporated, Asahi PPS produced by Asahi Glass Matex Co., Ltd., Fortron produced by Polyplastics Co., Ltd., Susteel produced by Tosoh Corporation, and Toralina produced by Toray Industries, Inc.

Examples of the liquid crystal polymer are wholly aromatic or semiaromatic polyester, polyester imide, polyester amide, polyamide-imide, polyester carbonate and polyazomethine, but the wholly aromatic liquid crystal polyester is particularly preferable. Examples of components of the liquid crystal polyester are aromatic dicarboxylic acid, aromatic hydroxy-carboxylic compound, aromatic diol compound, aromatic dithiol, aromatic thiophenol, aromatic thiolcarboxylic acid compound, aromatic hydroxyamine, aromatic diamine compound, and combinations of them. Examples of the aromatic polyester in the market are Vectra produced by Polyplastics Co., Ltd., Xydar produced by Nippon Oil Corporation, Sumika Super produced by Sumitomo Chemical Company, and Siveras produced by Toray Industries, Inc.

Examples of the reinforcing fiber included in the fiber reinforced resin complex are carbon fiber, glass fiber, carbon whisker, and potassium titanate whisker. In this case, the content of the reinforcing fiber in the fiber reinforced resin complex is preferably 10 to 50 volume percent. When the content of the reinforcing fiber is lower than 10 volume percent, desired strength of the driving shaft 16 cannot be obtained. On the other hand, when the content of the reinforcing fiber is higher than 50 volume percent, injection molding becomes difficult.

The operating principle of the driving device 10 having the above constitution is the same as that of the driving device 100 according to the conventional example. Overlapped explanation is, therefore, omitted.

Figure 5:
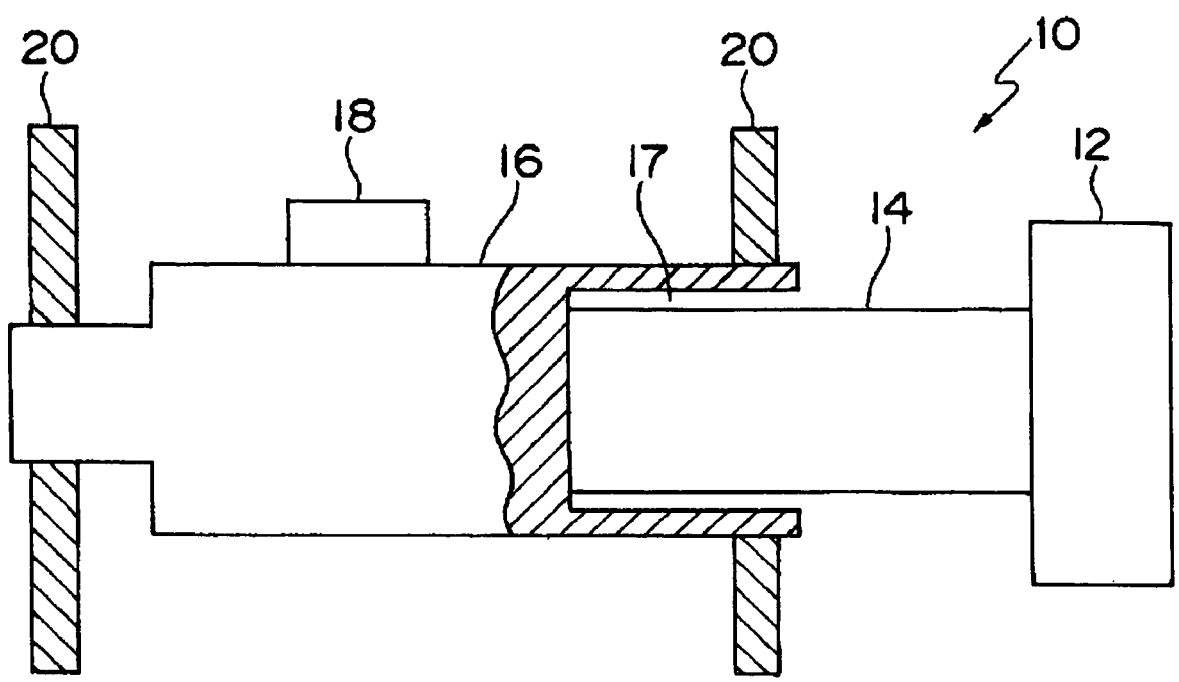
FIG. 5 is a diagram illustrating a modified example of a driving shaft.

In the driving shaft 16, a cross section which is vertical to the axial direction has a circular cross section with uniform diameter, but since the driving shaft 16 is formed by the fiber reinforced resin complex whose base is liquid crystal polymer or polyphenylene sulfide, the degree of shape freedom is high. As shown in FIG. 5, the driving shaft 16 can be easily formed so as to have a portion with different diameter at the end of the axial direction. Further, the driving shaft 16 may be formed so that the cross section vertical to the axial direction has a polygon shape such as an octagon shape, a hexagon shape and a square shape. When the driving shaft 16 has the polygon shape, since rotation of the movable body 18 about the driving shaft 16 can be prevented, it is not necessary to additionally provide a member that prevents the rotation of the movable body 18.

According to the above embodiment, the material of the movable body supporting member is the fiber reinforced resin complex, and the synthetic resin material composing the fiber reinforced resin complex is liquid crystal polymer or polyphenylene sulfide. As a result, the movable body supporting member can be manufactured by injection molding. As a result, in the movable body supporting member, the degree of shape freedom becomes high and the manufacturing cost can be low. Since this movable body supporting member is lighter than driving frictional member made of ceramic, the efficient transmission of the force from the electromechanical transducer can be realized, and the smooth surface which is suitable for the sliding movement of the movable body can be obtained without fabrication.

Although the present invention has been fully described by way of examples with reference to the accompanying drawings, it is to be noted that various changes and modifications will be apparent to those skilled in the art. Therefore, unless such changes and modification depart from the scope of the present invention, they should be construed as being included therein.

What is claimed is:

1. A driving device comprising:
    an electromechanical transducer which expands and contracts at the time of application of a voltage; and
    a movable body supporting member which slidingly supports a movable body, and is bonded to the electromechanical transducer so as to be displaced together with the transducer, said driving device sliding the movable body along the supporting member in a direction in which the supporting member vibrates using expansion and contraction of the electromechanical transducer,
    wherein a material of the supporting member is a fiber reinforced resin complex, and a synthetic resin material composing the fiber reinforced resin complex is liquid crystal polymer or polyphenylene sulfide.

2. A driving device according to claim 1, wherein the synthetic resin material composing the fiber reinforced resin complex is wholly aromatic polyester.

3. A driving device according to claim 1, wherein the reinforcing fiber included in the fiber reinforced resin complex are carbon fiber, glass fiber, carbon whisker, or potassium titanate whisker.

4. A driving device according to claim 3, wherein the content of the reinforcing fiber in the fiber reinforced resin complex is 10 to 50 volume percent.

5. A driving device according to claim 1, wherein the movable body supporting member includes a hollow portion.

6. A driving device according to claim 5, wherein the electromechanical transducer is fixed to the movable body supporting member with it being inserted into the hollow portion.

7. A driving device according to claim 1, the movable body supporting member has a portion with different diameter from the diameter of the other portion.

8. A driving device according to claim 1, the movable body supporting member is formed so that the cross section vertical to the axial direction has a polygon shape.

* * * * *